United States Patent
Doare et al.

(10) Patent No.: US 9,973,360 B2
(45) Date of Patent: May 15, 2018

(54) METHOD AND APPARATUS FOR GENERATING PHASE SHIFT CONTROL SIGNALS

(71) Applicant: NXP USA, Inc., Austin, TX (US)

(72) Inventors: Olivier Vincent Doare, La Salvetat St Gilles (FR); Dominique Delbecq, Fonsorbes (FR); Gilles Montoriol, Plaisance du Touch (FR)

(73) Assignee: NXP USA, Inc., Austin, TX (US)

( * ) Notice: Subject to any disclaimer, the term of this patent is extended or adjusted under 35 U.S.C. 154(b) by 0 days. days.

(21) Appl. No.: 15/366,273

(22) Filed: Dec. 1, 2016

(65) Prior Publication Data

US 2017/0180169 A1    Jun. 22, 2017

(30) Foreign Application Priority Data

Dec. 18, 2015   (WO) .................. PCT/IB2015/002560

(51) Int. Cl.
*H04L 27/00*    (2006.01)
*G06F 7/544*   (2006.01)
(Continued)

(52) U.S. Cl.
CPC .......... *H04L 27/0014* (2013.01); *G06F 7/548* (2013.01); *G06F 7/5446* (2013.01); *H04L 27/206* (2013.01); *H04L 2027/0016* (2013.01)

(58) Field of Classification Search
CPC ...... G01S 13/34; G01S 7/4056; G01S 13/931; H04L 27/0014; G06F 7/5446; G06F 7/548
See application file for complete search history.

(56) References Cited

U.S. PATENT DOCUMENTS

| | | | |
|---|---|---|---|
| 5,019,793 A | | 5/1991 | McNab |
| 5,864,492 A | * | 1/1999 | Sadot ................... G06F 1/0328 708/253 |

(Continued)

FOREIGN PATENT DOCUMENTS

| | | | | |
|---|---|---|---|---|
| EP | 1421687 A1 | * | 5/2004 | ............. H03H 11/22 |
| EP | 2983290 A1 | * | 2/2016 | ............. H05B 6/705 |

OTHER PUBLICATIONS

Li, Linsheng et al.: Design and implementation of an Active Antenna Array for TD-LTE System Based on DDS Phase Shifter1, 2013 Asia-Pacific Microwave Conference Proceedings, IEEE, 2013, pp. 672-67 (cited in the Applicant's IDS filed on Dec. 1, 2016).*

(Continued)

*Primary Examiner* — Chieh M Fan
*Assistant Examiner* — Berhanu Tadese (57) ABSTRACT

A phase shifter controller arranged to generate phase shift control signals for at least one phase shifter. The phase shifter controller is arranged to receive a first phase value $\theta_1$, receive a second phase value $\theta_2$, and output phase shift control signals. The phase shifter controller comprises a digital synthesizer arranged to compute a first digital phase shift control value based on the received first phase value $\theta_1$, and compute a second digital phase shift control value based on the received second phase value $\theta_2$. The phase shifter controller further comprises digital to analogue converters arranged to generate the phase shift control signals based on the derived first and second digital phase shift control values.

16 Claims, 4 Drawing Sheets

(51) Int. Cl.
*G06F 7/548* (2006.01)
*H04L 27/20* (2006.01)

(56) References Cited

U.S. PATENT DOCUMENTS

| | | | | | |
|---|---|---|---|---|---|
| 6,002,923 | A | * | 12/1999 | Sahlman | H04L 27/361 332/145 |
| 6,064,241 | A | * | 5/2000 | Bainton | G06F 1/025 327/105 |
| 6,249,249 | B1 | * | 6/2001 | Obayashi | H01Q 3/34 342/371 |
| 6,285,255 | B1 | * | 9/2001 | Luu | H03C 1/04 330/10 |
| 6,469,661 | B1 | * | 10/2002 | Doerry | G01S 7/288 342/194 |
| 6,522,176 | B1 | * | 2/2003 | Davis | G06F 1/0335 327/105 |
| 6,526,265 | B1 | * | 2/2003 | Damgaard | H03C 3/0966 331/4 |
| 7,227,346 | B1 | * | 6/2007 | Solbrig | G01R 25/005 324/607 |
| 7,382,193 | B2 | * | 6/2008 | Osman | H03F 1/0272 330/107 |
| 7,421,037 | B2 | * | 9/2008 | Shakeshaft | H03C 3/40 375/295 |
| 7,424,064 | B2 | * | 9/2008 | Shakeshaft | H03C 3/40 341/155 |
| 7,577,695 | B2 | * | 8/2009 | Dai | G06F 1/0328 708/271 |
| 7,952,516 | B2 | * | 5/2011 | Atherton | G01S 7/282 327/105 |
| 2005/0032483 | A1 | * | 2/2005 | Klomsdorf | H04B 1/0475 455/110 |
| 2007/0211821 | A1 | * | 9/2007 | Haque | H03F 3/217 375/297 |
| 2007/0293163 | A1 | * | 12/2007 | Kilpatrick | H04B 1/0483 455/84 |
| 2008/0109503 | A1 | * | 5/2008 | Gross | G06F 1/0328 708/275 |
| 2009/0085611 | A1 | * | 4/2009 | Rofougaran | H03B 21/00 327/106 |
| 2010/0295610 | A1 | * | 11/2010 | Svechtarov | H03F 1/0294 330/124 R |
| 2011/0193547 | A1 | * | 8/2011 | Max | G01R 31/2841 324/76.19 |
| 2014/0079154 | A1 | * | 3/2014 | Fratti | H04L 27/361 375/298 |
| 2016/0109559 | A1 | * | 4/2016 | Delbecq | G01S 13/34 342/170 |
| 2017/0041038 | A1 | * | 2/2017 | Kirkpatrick | G01S 13/02 |

OTHER PUBLICATIONS

Nishio, Takahide et ai.: "A High-speed Adaptive Antenna Array with Simultaneous Multiple-Beamforming Capability", 2003 IEEE MTT-S Digest, 2003, IEEE, pp. 1673-1676 (cited in the Applicant's IDS filed on Dec. 1, 2016).*

Li, Linsheng et al.: "Design and Implementation of an Active Antenna Array for TD-LTE System Based on DDS Phase Shifter", 2013 Asia-Pacific Microwave Conference Proceedings, IEEE, 2013, pp. 672-674.

Nishio, Takahide et al.: "A High-speed Adaptive Antenna Array with Simultaneous Multiple-Beamforming Capability", 2003 IEEE MTT-S Digest, 2003, IEEE, pp. 1673-1676.

* cited by examiner

METHOD AND APPARATUS FOR GENERATING PHASE SHIFT CONTROL SIGNALS

FIELD OF THE INVENTION

This invention relates to a method and apparatus for generating phase shift control signals. In particular, the invention relates to a phase shifter controller, a radio frequency transmitter comprising such a phase shifter controller and a method therefor of generating phase shift control signals.

BACKGROUND OF THE INVENTION

Figure 1:
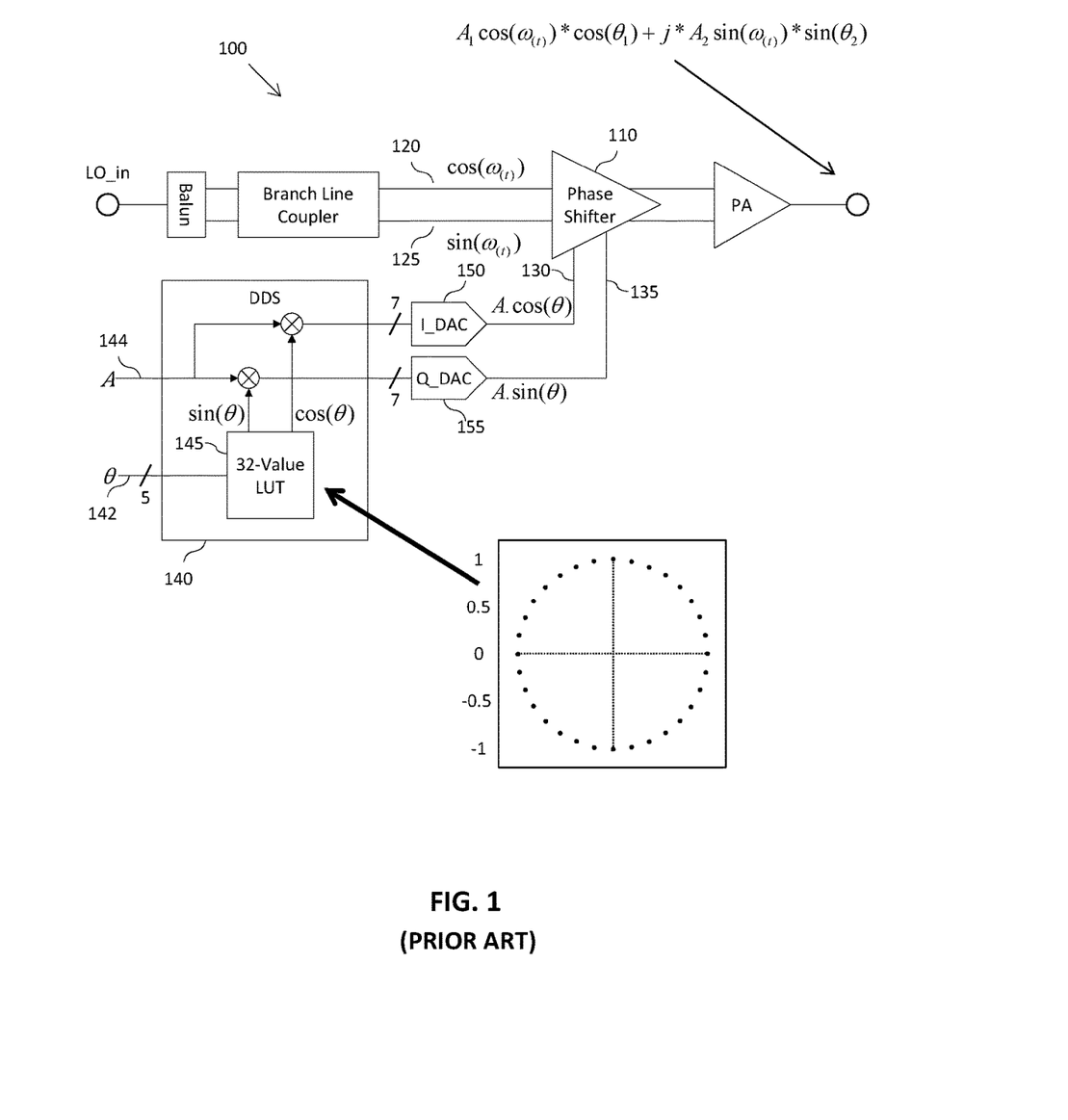
FIG. 1 illustrates a simplified block diagram of a part of a conventional radio frequency (RF) transmitter.

FIG. 1 illustrates a simplified block diagram of a part of a conventional radio frequency (RF) transmitter 100, such as may be used within a radar application requiring beamforming of the transmitted RF signals. The RF transmitter 100 includes a phase shifter 110 arranged to receive a complex (I/Q) RF signal consisting of a first (I) signal component $\cos(\omega_{(t)})$ 120 and a second (Q) signal component $\sin(\omega_{(t)})$ 125. The phase shifter 110 is further arranged to receive a complex (I/Q) control signal consisting of a first (I) phase shift control signal component $A \cdot \cos(\theta)$ 130 and a second (Q) phase shift control signal component $A \cdot \sin(\theta)$ 135. The phase shifter 110 is arranged to perform the operation a. $ej(\omega(t)+\theta)$ on the received complex signals to generate an output signal $f_{out}$ of:

$$f_{out} = \cos(\omega_{(t)}) \cdot A \cdot \cos(\theta) + \sin(\omega_{(t)}) \cdot A \cdot \sin(\theta) \quad \text{Equation 1}$$

However, in practice mismatch errors are introduced between the I and Q paths by the phase shifter 110, for example as a result of mismatched components, path layouts, etc. Consequently, the output signal $f_{out}$ is more accurately defined as:

$$f_{out} = \cos(\omega_{(t)}) \cdot A_1 \cdot \cos(\theta_1) + \sin(\omega_{(t)}) \cdot A_2 \cdot \sin(\theta_2) \quad \text{Equation 2}$$

The mismatch errors in the output signal $f_{out}$ degrade beamforming performance RF transmitter 100, and it is therefore desirable to compensate for such mismatch errors in order to optimize the beamforming performance of the RF transmitter 100.

In the conventional RF transmitter 100 architecture illustrated in FIG. 1, the phase shift control signal is generated by a direct digital synthesizer (DDS) 140. The DDS 140 receives a phase value θ 142, which is applied to a 32-value lookup table 145 to obtain corresponding sinusoidal values $\cos(\theta)$ and $\sin(\theta)$. The DDS 140 also receives an amplitude value A 144, which is multiplied by the sinusoidal values $\cos(\theta)$ and $\sin(\theta)$ to generate digital phase shift control values $A \cdot \cos(\theta)$ and $A \cdot \sin(\theta)$. The digital phase shift control values are then provided to digital to analogue converters (DACs) 150, 155 which generate the first (I) phase shift control signal component $A \cdot \cos(\theta)$ 130 and second (Q) phase shift control signal component $A \cdot \sin(\theta)$ 135 respectively based on the received digital phase shift control values.

A problem with the conventional architecture illustrated in FIG. 1 is that the 32-LUT limits the precision of the phase value θ to 11.25° (360°/32), preventing fine precision compensation of the phase shift control signals 130, 135. Another problem with the conventional architecture illustrated in FIG. 1 is that the same phase θ and amplitude A values 142, 144 are applied to both phase shift control signal components, making mismatch error compensation difficult.

SUMMARY OF THE INVENTION

The present invention provides a a phase shifter controller, a radio frequency transmitter and a method of generating phase shift control signals as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

In accordance with some example of the present invention, there is provided a phase shifter controller arranged to generate phase shift control signals for a phase shifter. The phase shifter controller is arranged to receive separate (first and second) phase values for each of the first and second phase shift control signals, and to compute sinusoidal values on which the phase shift control signals are derived using the separate phase values. In some further examples, the phase shifter controller may further be arranged to receive separate (first and second) amplitude values for each of the first and second phase shift control signals, and derive the phase shift control signals based on the separate amplitude values. Advantageously, this enables the phase (and amplitude) of the I/Q phase shift control signals to be controlled independently, which enables I/Q mismatch error from the analogue phase shifter to be digitally pre-compensated.

In accordance with one embodiment, the phase shifter controller may be implemented within an integrated circuit device comprising at least one die within a single integrated circuit package.

Figure 2:
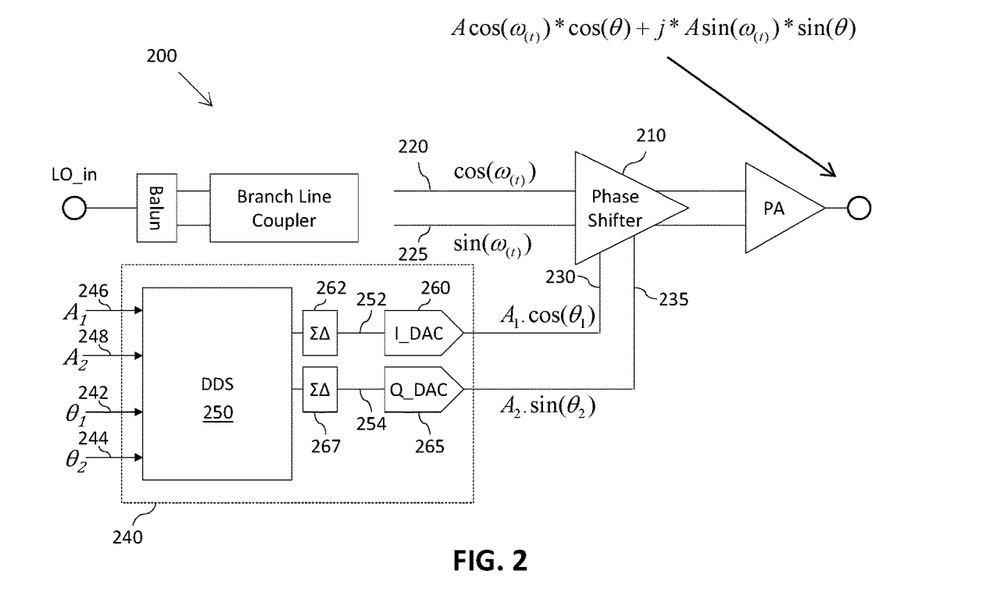
FIG. 2 illustrates a simplified block diagram of a part of a radio frequency (RF) transmitter according to an example of the present invention.

FIG. 2 illustrates a simplified block diagram of a part of a radio frequency (RF) transmitter 200. The RF transmitter 200 includes a phase shifter 210 arranged to receive a complex (I/Q) RF signal consisting of a first (I) signal component $\cos(\omega_{(t)})$ 220 and a second (Q) signal component $\sin(\omega_{(t)})$ 125. The phase shifter 210 is further arranged to receive a complex (I/Q) control signal, which in the example illustrated in FIG. 2 consists of a first (I) phase shift control signal $A_1 \cdot \cos(\theta_1)$ 230 and a second (Q) phase shift control signal $A_2 \cdot \sin(\theta_2)$ 235.

In the RF transmitter 200 architecture illustrated in FIG. 2, the phase shift control signals 230, 235 are generated by a phase shifter controller illustrated generally at 240. The phase shifter controller 240 includes a direct digital synthesizer (DDS) 250 arranged to receive a first phase value $\theta_1$ 242, compute a first digital phase shift control value 252 based on the received first phase value $\theta_1$ 242. The DDS 250 is further arranged to receive a second phase value $\theta_2$ 244, compute a second digital phase shift control value 254 based on the received second phase value $\theta_2$ 244.

In the example illustrated in FIG. 2, the DDS 250 is further arranged to receive a first amplitude value $A_1$ 246 and a second amplitude value $A_2$ 248, and to derive the first and second digital phase shift control values 252, 254 further based on the received first and second amplitude values $A_1$ 246, $A_2$ 246 respectively.

The phase shifter controller 240 is further arranged to generate the first phase shift control signal component $A_1 \cdot \cos(\theta_1)$ 230 based on the computed first digital phase shift control value 252 and to generate the second phase shift control signal component $A_2 \cdot \sin(\theta_2)$ 235 based on the computed second digital phase shift control value 254, for example by way of digital to analogue converters (DACs) 260, 265. In some examples, such as the example illustrated in FIG. 2, the DACs 260, 265 may be coupled to the DDS 250 via sigma delta modulators 262, 267. In this manner, and as described in greater detail below, high resolution digital phase control values computed by the DDS 250 may be converted into modulated lower resolution digital phase shift control values 252, 254 received by the DACs 260, 265.

Figure 3:
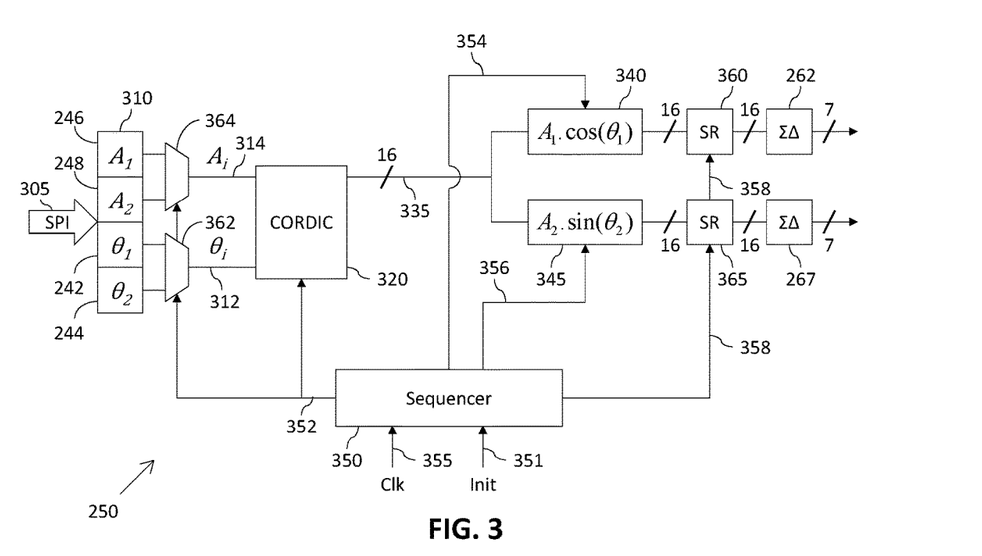
FIG. 3 illustrates a simplified block diagram of an example of a digital synthesizer.

FIG. 3 illustrates a simplified block diagram of an example of the DDS 250 of FIG. 2. In the example illustrated in FIG. 3, the DDS 250 includes, or is coupled to, a memory element 310 such as a register within which the phase values $\theta_1$ 242, $\theta_2$ 244 and amplitude values $A_1$ 246, $A_2$ 248 are stored. For example, and as illustrated generally at 305, the memory element may be programmable by SPI (serial peripheral interface) access.

The DDS 250 illustrated in FIG. 3 further includes a sinusoidal computation component 320, such as a CORDIC (COordinate Rotation DIgital Computer) hardware module, arranged to receive a phase value $\theta_i$ 312, compute a sinusoidal value for the received phase value $\theta_i$ 312 and output a digital phase shift control value 335 based on the computed sinusoidal value. In the illustrated example, the sinusoidal computation component 320 is further arranged to receive an amplitude value $A_i$ 314 and compute the digital phase shift control value 335 further based on the amplitude value $A_i$ 314.

The DDS 250 illustrated in FIG. 3 further includes a first control value buffer element 340 and a second control value buffer element 345. The first and second control value buffer elements 340, 345 are each controllable to store the digital phase shift control value 335 output by the sinusoidal computation component 320.

A sequencer component 350 is arranged to, during a first control signal generation stage:
cause the first phase value $\theta_1$ 242 and the first amplitude value $A_1$ 246 to be provided to the sinusoidal computation component 320;
configure the sinusoidal computation component 320 to compute and output the first digital phase shift control value 335 $A_1 \cdot \cos(\theta_1)$; and
cause the first control value buffer element 340 to store therein the first digital phase shift control value 335 $A_1 \cdot \cos(\theta_1)$ output by the sinusoidal computation component 320.

The sequencer component 350 is further arranged, during a second control signal generation stage:
cause the second phase value $\theta_2$ 244 and the second amplitude value $A_2$ 248 to be provided to the sinusoidal computation component 320;
configure the sinusoidal computation component 320 to compute and output the second digital phase shift control value 335 $A_2 \cdot \sin(\theta_2)$; and
cause the second control value buffer element 345 to store therein the second digital phase shift control value 335 $A_2 \cdot \sin(\theta_2)$ output by the sinusoidal computation component 320.

In the example illustrated in FIG. 3, a first multiplexer component 362 is arranged to receive at data inputs thereof the first and second phase values $\theta_1$ 242, $\theta_2$ 244 stored within the memory element 310. The first multiplexer component 362 is further arranged to receive a first sequencer signal 352 output by the sequencer component 350, and to selectively output to the sinusoidal computation component 320 one of the received phase values $\theta_1$ 242, $\theta_2$ 244 depending on a logical level of the first sequencer signal 352. A second multiplexer component 364 is arranged to receive at data inputs thereof the first and second amplitude values $A_1$ 246, $A_2$ 248 stored within the memory element 310. The second multiplexer component 364 is further arranged to receive a first sequencer signal 352 output by the sequencer component 350, and to selectively output to the sinusoidal computation component 320 one of the received amplitude values $A_1$ 246, $A_2$ 248 depending on a logical level of the first sequencer signal 352. In this manner, the sequencer component 350 is arranged to control which pair of phase and amplitude values are provided to the sinusoidal computation component 320 by way of setting the logical level (e.g. a logical '1' or a logical '0') of the first sequencer signal 352.

In the example illustrated in FIG. 3, the first sequencer signal 352 is also provided to the sinusoidal computation component 320, with the sinusoidal computation component 320 being configurable to compute and output either a cosine sinusoidal signal $A_i \cos(\theta_i)$ for the received phase value $\theta_i$ 312 and amplitude value $A_i$ 314 or a sinusoidal signal $A_i \sin(\theta_i)$ for the received phase value $\theta_i$ 312 and amplitude value $A_i$ 314. In this manner the sequencer component 350 is arranged to control which computation (i.e. $A_i \cos(\theta_i)$ or $A_i \sin(\theta_i)$) the sinusoidal computation component 320 is arranged to perform.

Thus, the sequencer component 350 is able to cause, via the first sequencer signal 352, the sinusoidal computation component 320 to output either a first digital phase shift control value 335 consisting of $A_1 \cdot \cos(\theta_1)$ or a second digital phase shift control value 335 consisting of $A_2 \cdot \sin(\theta_2)$.

The sequencer component 350 is further arranged to output a second sequencer signal 354, which is received by the first control value buffer element 340, and the first control value buffer element 340 is controllable via the second sequencer signal 354 to store therein the digital phase shift control value 335 output by the sinusoidal computation component 320. The sequencer component 350 is further arranged to output a third sequencer signal 356, which is received by the second control value buffer element 345, and the second control value buffer element 345 is controllable via the third sequencer signal 356 to store therein the digital phase shift control value 335 output by the sinusoidal computation component 320.

Figure 4:
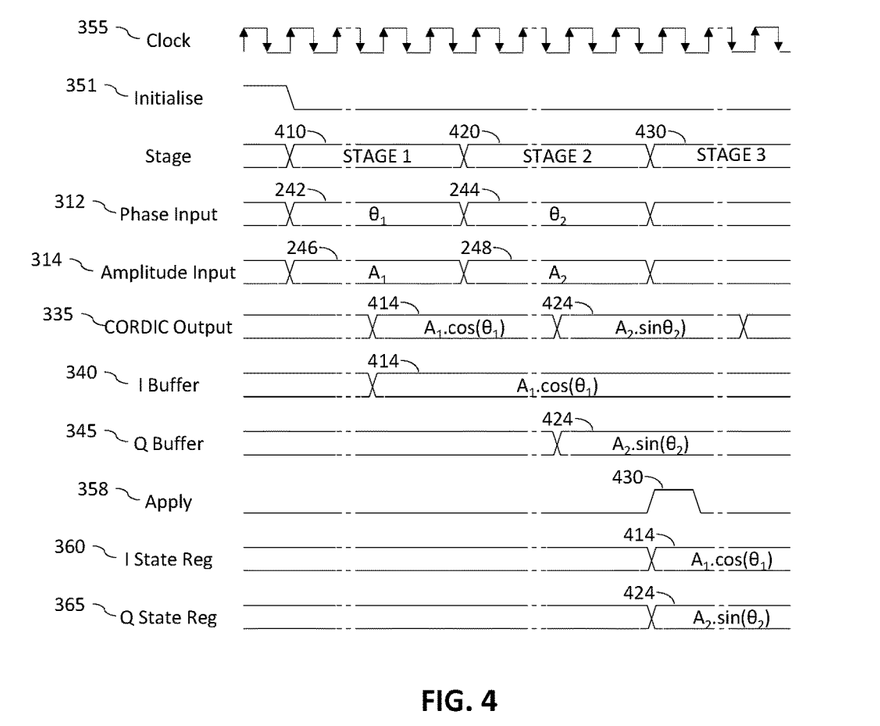
FIG. 4 illustrates a simplified timing diagram showing an example of a sequence of events within the digital synthesizer of FIG. 3.

FIG. 4 illustrates a simplified timing diagram showing an example of a sequence of events within the DDS 250. The sequence of events is controlled by the sequencer component 350, based on a clock signal 355 (FIG. 3) received by the sequencer component 350. Upon receipt of an initialise signal 351, the sequencer component 350 is arranged to initiate the first control signal generation stage, indicated at 410 in FIG. 4. Upon initiating the first control signal generation state 410, the sequencer component 350 is arranged to set the first sequencer signal 352 to a first logical level (e.g. a logical '0') to cause:

the first phase value $\theta_1$ 242 and the first amplitude value $A_1$ 246 to be input to the sinusoidal computation component 320; and the sinusoidal computation component 320 to compute and output the first digital phase shift control value $A_1 \cos(\theta_1)$ 414.

During the first control signal generation state 410, the sequencer component 350 is further arranged to set the second sequencer signal 354 to configure the first control value buffer element 340 to read the first digital phase shift control value 414 output by the sinusoidal computation component 320.

After a defined number of clock cycles from receipt of the initialise signal 351 (sufficient for the sinusoidal computation component 320 to compute and output the first digital phase shift control value $A_1 \cos(\theta_1)$ 414, and for the first control value buffer element 340 to read the first digital phase shift control value $A_1 \cdot \cos(\theta_1)$ 414 output by the sinusoidal computation component 320), the sequencer component 350 is arranged to initiate the second control signal generation stage, indicated at 420 in FIG. 4. Upon initiating the second control signal generation state 420, the sequencer component 350 is arranged to set the second sequencer signal 354 to configure the first control value buffer element 340 to store and hold its current digital phase shift control value 414 consisting of $A_1 \cdot \cos(\theta_1)$. The sequencer component 350 is further arranged to set the first sequencer signal 352 to a second logical level (e.g. a logical '1') to cause:

the second phase value $\theta_2$ 244 and the second amplitude value $A_2$ 248 to be input to the sinusoidal computation component 320; and the sinusoidal computation component 320 to compute and output the second digital phase shift control value $A_2 \sin(\theta_2)$ 424.

During the second control signal generation state 420, the sequencer component 350 is further arranged to set the third sequencer signal 356 to configure the second control value buffer element 345 to read the second digital phase shift control value 424 output by the sinusoidal computation component 320.

After a further defined number of clock cycles from receipt of the initialise signal 351 (sufficient for the sinusoidal computation component 320 to compute and output the second digital phase shift control value $A_2 \sin(\theta_2)$ 424, and for the second control value buffer element 345 to read the second digital phase shift control value $A_2 \sin(\theta_2)$ 424 output by the sinusoidal computation component 320), the sequencer component 350 is arranged to initiate a control signal configuration stage, indicated at 430 in FIG. 4. Upon initiating the control signal configuration stage 430, the sequencer component 350 is arranged to set the third sequencer signal 356 to configure the second control value buffer element 345 to store and hold its current digital phase shift control value 424 consisting of $A_2 \cdot \sin(\theta_2)$. The sequencer component 350 is further arranged to set an apply signal 358 to cause the digital phase shift control values 414, 424 stored within the control value buffer elements 340, 345 to be output by the DDS 250.

Referring back to FIG. 3, the DDS 250 in the illustrated example includes a first output memory element 360 controllable via the apply signal 358 to read and store therein the digital phase shift control value ($A_1 \cos(\theta_1)$ 414) stored within the first control value buffer element 340, and subsequently to output the stored digital phase shift control value. The DDS 250 in the illustrated example further includes a second output memory element 365 controllable via the apply signal 358 to read and store therein the digital phase shift control value ($A_2 \sin(\theta_2)$ 424) stored within the second control value buffer element 345, and subsequently to output the stored digital phase shift control value. As illustrated in FIG. 4, each of the first and second output memory element 360, 365 in the illustrated example is arranged to read ('capture') the digital phase shift control value 414, 424 stored within the respective control value buffer element 340, 345 on a rising edge of the apply signal 358.

The digital phase shift control values 414, 424 within the first and second output memory element 360, 365 are then used for generating the phase shift control signals 230, 235 (FIG. 2). Significantly, the digital phase shift control values 414, 424 are generated based on separate phase values $\theta_1$ 242, $\theta_2$ 244. Furthermore, in the illustrated example the digital phase shift control values 414, 424 are generated based on separate amplitude values $A_1$ 246, $A_2$ 248. Advantageously, this enables the amplitude and phase of the phase shift control signals 230, 235 to be controlled independently, which enables mismatch error from the analogue phase shifter 210 to be digitally pre-compensated for, thereby enabling the beamforming process of the RF transmitter 200 to be optimised.

The use of a sinusoidal computation component 320, for example a CORDIC hardware module, enables a higher resolution phase and amplitude control to be achieved as compared with the 32-value lookup table architecture of the prior art illustrated in FIG. 1. For example, the sinusoidal computation component 320 may be arranged to receive a 16-bit phase value $\theta_i$ 312. Moreover the amplitude value $A_i$ 314 may consist of, for example, 15 bits allowing an amplitude step compensation of $Vpp/(2^{15})$. The sinusoidal computation component 320 may thus compute and output a 16-bit digital phase shift control value 335. Such a 16-bit digital phase shift control value 335 enables a precision of 0.01°, as opposed to just 11.25° achievable with the 32-value lookup table architecture of the prior art illustrated in FIG. 1. Notably, to achieve a precision of 0.01° using a lookup table architecture would require a lookup table consisting of over 65,000 entries, and to enable the amplitude and phase of the phase shift control signals 230, 235 to be controlled independently would require two such lookup tables. Such a lookup table implementation would be prohibitively large to implement.

In the example illustrated in FIGS. 3 and 4, the sinusoidal computation component 320 is arranged to compute the digital phase shift control values 414, 424 sequentially. In this manner, only a single sinusoidal computation component 320 is required for computing the independent first and second digital phase shift control values $A_1 \cos(\theta_1)$ and $A_2 \sin(\theta_2)$ 414, 424.

As mentioned above, the use of the sinusoidal computation component 320 enables higher resolution (e.g. 16-bit) digital phase shift control value 335 to be achieved. However, 16-bit DAC operating at, for example, 240 MHz is hard to achieve with a good linearity. To overcome this problem, and as illustrated in the example of FIGS. 2 and 3, a sigma delta modulator 262, 267 may be coupled to each of the output memory elements 360, 365, and arranged to convert the high resolution digital phase shift control value 414, 424 stored within the respective output memory element 360, 365 from, in the illustrated example, a 16-bit digital phase control value 414, 424 into a modulated lower resolution (e.g. 7-bit) digital phase shift control value 252, 254 output to the respective DAC 260, 265. In this manner, a lower resolution DAC 260, 265 may be implemented to convert the digital phase shift control value 252, 254 into analogue digital phase shift control values 230, 235 for controlling the phase shifter 210. It is contemplated that the sigma delta sampling frequency is high enough to not disturb the in-band signal of the received digital phase shift control values 414, 424. In some examples, the sigma delta modulation may be applied to only the least significant bits of the received digital phase shift control values 414, 424.

Although a hardware sinusoidal computation component 320, such as a CORDIC hardware module, has been hereinbefore described with reference to the example illustrated in FIG. 3, it is contemplated that in some examples of the present invention the sinusoidal computation may alternatively be implemented within software, with the digital phase shift control values 335 (e.g. $A_1 \cdot \cos(\theta_1)$ and $A_2 \cdot \sin(\theta_2)$) being provided directly by such software to the control value buffer elements 340, 345. In such an example, the DDS 250 may be implemented at least partly by way of software executing on a general purpose processing core, or alternatively on a dedicated digital signal processing device of the DDS 250.

Figure 5:
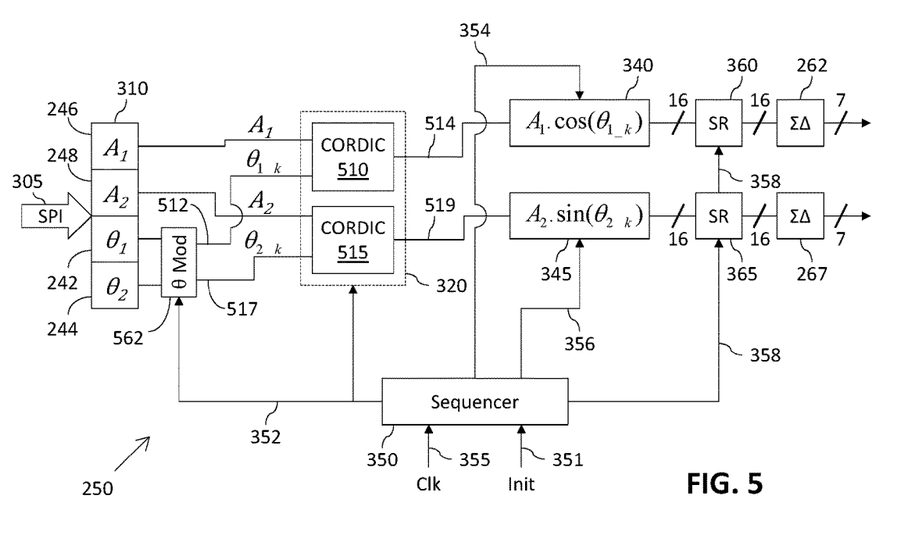
FIG. 5 illustrates a simplified block diagram of an alternative example of a digital synthesizer.

Referring now to FIG. 5, there is illustrated a simplified block diagram of an alternative example of the DDS 250 of FIG. 2. For convenience and ease of understanding like reference numerals are used to identify features in common between the DDS examples of FIGS. 3 and 5. In the example illustrated in FIG. 5, the DDS 250 is arranged to generate dynamic (non-static) phase shift control signals 230, 235, and includes, or is coupled to, a memory element 310 within which the phase values $\theta_1$ 242, $\theta_2$ 244 and amplitude values $A_1$ 246, $A_2$ 248 are stored. For example, as illustrated generally at 305, the memory element may be programmable by SPI (serial peripheral interface) access.

The DDS 250 illustrated in FIG. 5 further includes a sinusoidal computation component 320 arranged to receive dynamic phase values $\theta_{1\_k}$, $\theta_{2\_k}$ 512, 517, compute sinusoidal values for the received dynamic phase values $\theta_{1\_k}$: $\theta_{2\_k}$ 512, 517 and output dynamic digital phase shift control values 514, 519 based on the computed sinusoidal values. In the illustrated example, the sinusoidal computation component 320 is further arranged to receive the amplitude values $A_1$ 246, $A_2$ 248 and compute the dynamic digital phase shift control values 514, 519 further based on the amplitude values $A_1$ 246, $A_2$ 248. In particular for the example illustrated in FIG. 5, the sinusoidal computation component 320 comprises a first CORDIC module 510 arranged to receive a first dynamic phase value $\theta_{1\_k}$ 512 and the first amplitude value $A_1$ 246, and to compute and output a first dynamic digital phase shift control value 514. The sinusoidal computation component 320 further comprises a second CORDIC module 515 arranged to receive a second dynamic phase value $\theta_2$ 517 and the second amplitude value $A_2$ 248, and to compute and output a second dynamic digital phase shift control value 519.

The DDS 250 illustrated in FIG. 5 further includes a first control value buffer element 340 and a second control value buffer element 345. The first and second control value buffer elements 340, 345 are controllable to store the dynamic digital phase shift control values 514, 519 output by the sinusoidal computation component 320.

A sequencer component 350 is arranged to, during a control signal generation cycle:
cause a first dynamic phase value $\theta_{1\_k}$ 512 derived from the first phase value $\theta_1$ 242 and a second dynamic phase value $\theta_{2\_k}$ 517 derived from the second phase value $\theta_2$ 244 to be provided to the sinusoidal computation component 320;
cause the sinusoidal computation component 320 to compute and output the dynamic digital phase shift control values $A_1 \cdot \cos(\theta_{1\_k})$ 514, $A_2 \cdot \sin(\theta_{2\_k})$ 519; and
cause the first and second control value buffer elements 340, 345 to store therein the first and second digital phase shift control values 514, 519 respectively output by the sinusoidal computation component 320.

In the example illustrated in FIG. 5, a phase modifier 562 is arranged to receive at data inputs thereof the first and second phase values $\theta_1$ 242, $\theta_2$ 244 stored within the memory element 310. In one example, the first and second phase values $\theta_1$ 242, $\theta_2$ 244 are used by the phase modifier 562 as phase step values. The phase modifier 562 is further arranged to receive a first sequencer signal 352 output by the sequencer component 350, and to selectively output to the sinusoidal computation component 320 the dynamic phase values $\theta_{1\_k}$, $\theta_{2\_k}$ 512, 517 derived from the received phase step values $\theta_1$ 242, $\theta_2$ 244 in accordance with the received first sequencer signal 352.

For example, upon initialisation of the DDS 250, the phase modifier 562 reads the first and second phase step values $\theta_1$ 242, $\theta_2$ 244 and sets respective first and second dynamic phase values $\theta_{1\_k}$, $\theta_{2\_k}$ equal to the first and second phase step values $\theta_1$ 242, $\theta_2$ 244. Upon receipt of an active edge (e.g. either a rising or falling edge) of the first sequencer signal 352, the phase modifier 562 may increment each of the first and second dynamic phase values $\theta_{1\_k}$; $\theta_{2\_k}$ by a step equal to the respective phase step values $\theta_1$ 242, $\theta_2$ 244. For example, when the first dynamic phase value $\theta_{1\_k}$ is output to the sinusoidal computation component 320 following initialisation of the DDS 250, it will have a value equal to the first phase step value $\theta_1$ 242. Upon subsequent receipt of an active edge of the first sequencer signal 352, the phase modifier 562 increments the first dynamic phase value $\theta_{1\_k}$ by a step equal to the first phase step value $\theta_{1\_k}$. Consequently, the first dynamic phase value $\theta_{1\_k}$ will subsequently have a value equal to twice the first phase step value $\theta_1$ 242. Thus, upon each active edge of the first sequencer signal 352, the first dynamic phase $\theta_{1\_k}$ is incremented such that: $\theta_{1\_(k+1)} = \theta_{1\_k} + \theta_1$. Similarly, a upon each active edge of the first sequencer signal 352, the second dynamic phase value $\theta_{2\_k}$ is incremented such that: $\theta_{2\_(k+1)} = \theta_{2\_k} + \theta_2$.

In the example illustrated in FIG. 5, the first sequencer signal 352 is also provided to the sinusoidal computation component 320, with the sinusoidal computation component 320 being arranged to compute and output the dynamic digital phase shift control values $A_1 \cdot \cos(\theta_{1\_k})$ 514, $A_2 \cdot \sin(\theta_{2\_k})$ 519 upon each active edge of the first sequencer signal 352. Note, the active edge of the first sequencer signal 352 from the perspective of the sinusoidal computation component 320 may the opposite to that from the perspective of the phase modifier 562. For example, the active edge of the first sequencer signal 352 from the perspective of the sinusoidal computation component 320 may be, for example, a rising edge, whilst the active edge of the first sequencer signal 352 from the perspective of the phase modifier 562 may be a falling edge.

The sequencer component 350 is further arranged to output a second sequencer signal 354, which is received by the first control value buffer element 340, and the first control memory element 340 is controllable via the second sequencer signal 354 to store therein the first dynamic digital phase shift control value 514 output by the sinusoidal computation component 320. The sequencer component 350 is further arranged to output a third sequencer signal 356, which is received by the second control value buffer element 345, and the second control memory element 345 is controllable via the third sequencer signal 356 to store therein the second dynamic digital phase shift control value 515 output by the sinusoidal computation component 320.

The DDS 250 in the illustrated example includes a first output memory element 360 controllable via an apply signal 358 to read and store therein the first dynamic digital phase shift control value 514 stored within the first control value buffer element 340, and subsequently to output the stored first dynamic digital phase shift control value 514. The DDS 250 in the illustrated example further includes a second output memory element 365 controllable via the apply signal 358 to read and store therein the second dynamic digital phase shift control value 519 stored within the second control value buffer element 345, and subsequently to output the stored second dynamic digital phase shift control value 519. The dynamic digital phase shift control values 514, 519 within the first and second output memory element 360, 365 are then used for generating the phase shift control signals 230, 235 (FIG. 2).

As described above, during a control signal generation cycle, the sequencer component 350 is arranged to configure the first sequencer signal 352 (e.g. by setting it to a logical '1' to produce a rising edge) to control the sinusoidal computation component 320 to output a first and second (stepped) digital phase shift control values 514, 519 consisting of $A_1 \cdot \cos(\theta_{1\_k})$ and $A_2 \cdot \sin(\theta_{2\_k})$. The sequencer component 350 is further arranged, during the first control signal generation cycle, to configure the second sequencer signal 354 to control the first and second control memory elements 340 345 to store therein the first and second (stepped) digital phase shift control values 514, 519. Upon the sequencer component 350 subsequently setting the first sequencer signal 352 to a logical '0' to produce a falling edge, the phase modifier 562 updates (e.g. increments) the dynamic phase values $\theta_{1\_k}, \theta_{2\_k}$.

At the end of the control signal generation cycle, once the first and second digital phase shift control values 514, 519 have been stored within the respective first and second control memory elements 340, 345, the sequencer component 350 is arranged to configure the apply signal 358 to control the output memory elements 360, 365 to read and store the digital phase shift control values 514, 519 stored within the control memory elements 340, 345, and subsequently to output the stored digital phase shift control values.

Unlike in the static control signal example illustrated in FIG. 3, the DDS 250 illustrated in FIG. 5 is arranged to recurrently update the digital phase shift control values output to the DACs 260, 265 for generating the phase shift control signals 230, 235 (FIG. 2). Accordingly, the sequencer 350 is arranged to recurrently repeat the control signal cycle, with the phase modifier 562 being arranged to modify (increment) the dynamic phase values $\theta_{1\_k}, \theta_{2\_k}$ 512, 517 each cycle k as described above.

It will be appreciated that the non-static (dynamic) implementation illustrated in FIG. 5 is not limited to generating digital phase shift control values that are recurrently updated based on a stepped phase modulation as described above, and it is contemplated that the phase modifier 562 may apply any alternative form of modulation to the dynamic phase values $\theta_{1\_k}, \theta_{2\_k}$ 512, 517 provided to the sinusoidal computation component 320.

Figure 6:
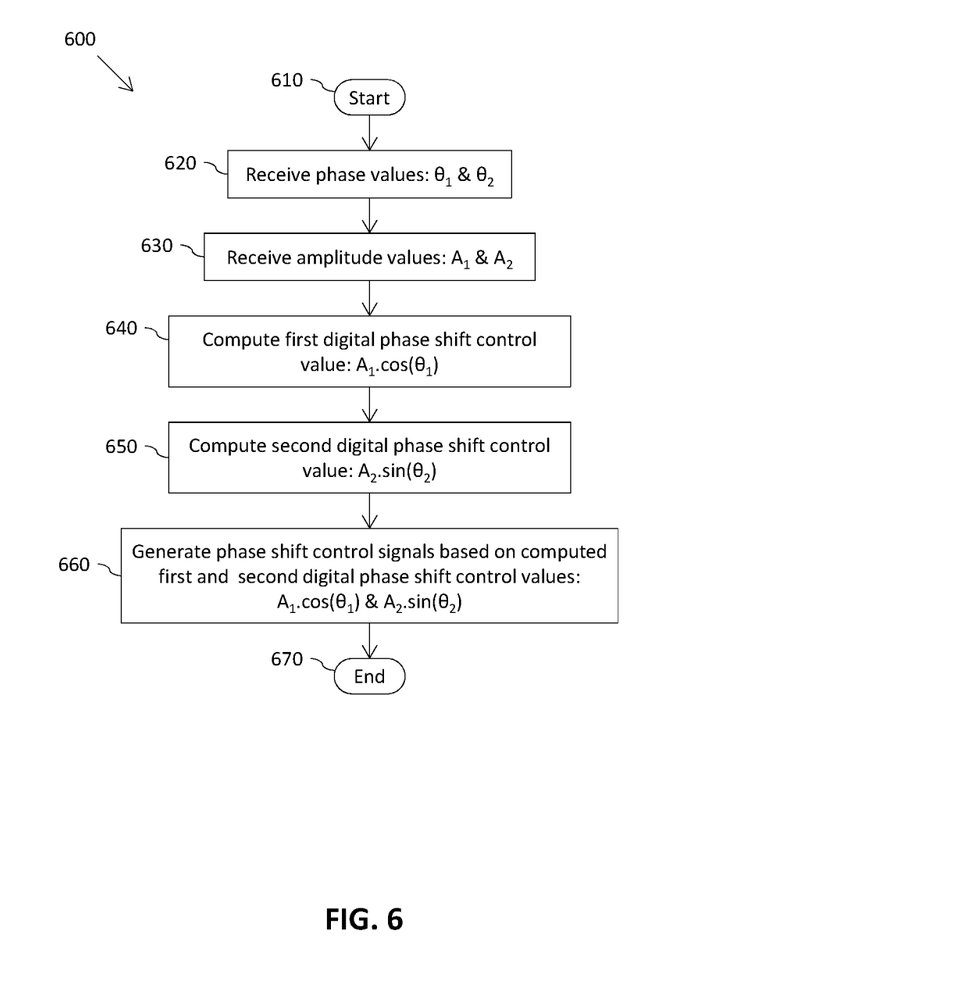
FIG. 6 illustrates a simplified flowchart 600 of an example of a method of generating phase shift control signals for a phase shifter.

Referring now to FIG. 6, there is illustrated a simplified flowchart 600 of an example of a method of generating phase shift control signals for a phase shifter, such as may be implemented within the DDS 250 of FIG. 2. The method starts at 610 and moves on to 620, where first and second phase values $\theta_1$ and $\theta_2$ are received. In the example illustrated in FIG. 6, first and second amplitude values $A_1$ and $A_2$ are also received, at 630. A first digital phase shift control value $A_1 \cdot \cos(\theta_1)$ is computed at 640, based on the received first phase value $\theta_1$ and the first amplitude value $A_1$. A second digital phase shift control value $A_2 \cdot \sin(\theta_2)$ is then computed at 650, based on the received second phase value $\theta_2$ and the second amplitude value $A_2$. Phase shift control signals are then generated based on the derived first and second digital phase shift control values, at 660. The method then ends at 670.

In some examples, the method of FIG. 6 may further include performing sigma delta modulation to convert the (high resolution) digital phase shift control values into modulated lower resolution digital phase shift control values to be output to digital to analogue converters for generating the phase shift control signals.

The invention may be implemented, at least in part, in a computer program for running on one or more processor devices, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A phase shifter controller arranged to generate phase shift control signals for at least one phase shifter, the phase shifter controller being arranged to:
receive a first phase value θ1;
receive a second phase value θ2; and
output phase shift control signals,
wherein the phase shifter controller comprises a digital synthesizer arranged to:
compute a first digital phase shift control value based on the received first phase value θ1; and
compute a second digital phase shift control value based on the received second phase value θ2;
wherein the phase shifter controller further comprises digital to analogue converters arranged to generate the phase shift control signals based on the derived first and second digital phase shift control values;
wherein the digital synthesizer comprises a sinusoidal computation component arranged to receive a phase value and compute a digital phase shift control value based on the received phase value and output the derived digital phase shift control value;
wherein the phase shifter controller further comprises:
a first control value buffer element controllable to store the derived digital first phase shift control value output by the sinusoidal computation component;
a second control value buffer element controllable to store the derived digital second phase shift control value output by the sinusoidal computation component; and
a sequencer component arranged to during a control signal generation cycle:
cause a first dynamic phase value θ1_k derived from the first phase value θ1 to be provided to the sinusoidal computation component;
cause a second dynamic phase value θ2_k derived from the second phase value θ2 to be provided to the sinusoidal computation component;
cause the sinusoidal computation component to compute and output first and second digital phase shift control values based on the dynamic phase values θ1_k, θ2_k; and
cause the first and second control value buffer elements to receive and store therein the derived first and second digital phase shift control values output by the sinusoidal computation component.

2. The phase shifter controller of claim 1 further arranged to receive a first amplitude value $A_1$ and a second amplitude value $A_2$, and the digital synthesizer is arranged to:
compute the first digital phase shift control value further based on the received first amplitude value $A_1$; and
compute the second digital phase shift control value further based on the received second amplitude value $A_2$.

3. The phase shifter controller of claim 1, wherein the sinusoidal computation component comprises a CORDIC (COordinate Rotation DIgital Computer) module.

4. The phase shifter controller of claim 1 further comprising:

a first control value buffer element controllable to store the derived digital phase shift control value output by the sinusoidal computation component;
a second control value buffer element controllable to store the derived digital phase shifter control value output by the sinusoidal computation component; and
a sequencer component arranged to:
during a first control signal generation stage cause the first phase value $θ_1$ to be provided to the sinusoidal computation component, configure the sinusoidal computation component to compute and output the first digital phase shift control value, and cause the first control value buffer element to receive and store therein the derived digital phase shift control value output by the sinusoidal computation component; and
during a second control signal generation stage cause the second phase value $θ_2$ to be provided to the sinusoidal computation component, configure the sinusoidal computation component to compute and output the second digital phase shift control value, and cause the second control value buffer element to receive and store therein the derived digital phase shift control value output by the sinusoidal computation component.

5. The phase shifter controller of claim 4, wherein the sequencer component is further arranged to:
during the first control signal generation stage provide a first amplitude value $A_1$ to the sinusoidal computation component of the digital synthesizer; and
during the second control signal generation stage provide a second amplitude value $A_2$ to the sinusoidal computation component of the digital synthesizer,
and the sinusoidal computation component of the digital synthesizer is arranged to derive and output digital phase shift control values further based on received amplitude values.

6. The phase shifter controller of claim 1 further comprising a phase modifier arranged to receive the first and second phase values $θ_1$, $θ_2$, and derive the dynamic phase values $θ_{1\_k}$, $θ_{2\_k}$ from the first and second phase values $θ_1$, $θ_2$.

7. The phase shifter controller of claim 1 further comprising sigma delta modulators arranged to convert high resolution digital phase shift control values derived by the digital synthesizer into modulated lower resolution digital phase shift control values output to the digital to analogue converters.

8. The phase shifter controller of claim 1 implemented within an integrated circuit device comprising at least one die within a single integrated circuit package.

9. A radio frequency transmitter comprising:
a phase shifter arranged to receive a radio frequency signal and perform a phase shifting operation on the radio frequency signal; and
a phase shifter controller arranged to generate phase shift control signals for the phase shifter, the phase shifter controller being arranged to:
receive a first phase value θ1,
receive a second phase value θ2, and
output phase shift control signals,
wherein the phase shifter controller comprises a digital synthesizer arranged to
compute a first digital phase shift control value based on the received first phase value θ1 and
compute a second digital phase shift control value based on the received second phase value θ2, and digital to analogue converters arranged to generate the phase shift control signals based on the derived first and second digital phase shift control values, wherein the digital synthesizer comprises a sinusoidal computation component arranged to receive a phase value and compute a digital phase shift control value based on the received phase value and out the derived digital phase shift control value;

wherein the phase shifter controller further comprises:
a first control value buffer element controllable to store the derived first digital phase shift control value output by the sinusoidal computation component;
a second control value buffer element controllable to store the derived second digital phase shift control value output by the sinusoidal computation component; and
a sequencer component arranged to:
during a first control signal generation stage cause the first phase value θ1 to be provided to the sinusoidal computation component, configure the sinusoidal computation component to compute and output the first digital phase shift control value, and cause the first control value buffer element to receive and store therein the derived digital phase shift control value output by the sinusoidal computation component; and
during a second control signal generation stage the second phase value θ2 to be provided to the sinusoidal computation component, configure the sinusoidal computation component to compute and output the second digital phase shift control value, and cause the second control value buffer element to receive and store therein the derived digital phase shift control value output by the sinusoidal computation component.

10. The radio frequency transmitter of claim 9, wherein the phase shifter controller is further arranged to receive a first amplitude value $A_1$ and a second amplitude value $A_2$, and the digital synthesizer is arranged to:
compute the first digital phase shift control value by multiplying the first sinusoidal value $\cos(\theta_1)$ by the first amplitude value $A_1$; and
compute the second digital phase shift control value by multiplying the second sinusoidal value $\sin(\theta_2)$ by the second amplitude value $A_2$.

11. The radio frequency transmitter of claim 9, wherein the phase shifter controller further comprises:
a first control value buffer element controllable to store the derived digital phase shift control value output by the sinusoidal computation component;
a second control value buffer element controllable to store the derived digital phase shifter control value output by the sinusoidal computation component; and
a sequencer component arranged to, during a control signal generation cycle:
cause a first dynamic phase value $\theta_{1\_k}$ derived from the first phase value $\theta_1$ to be provided to the sinusoidal computation component;
cause a second dynamic phase value $\theta_{1\_k}$ derived from the second phase value $\theta_2$ to be provided to the sinusoidal computation component;
cause the sinusoidal computation component to compute and output first and second digital phase shift control values based on the dynamic phase values $\theta_{1\_k}$, $\theta_{2\_k}$; and
cause the first and second control value buffer elements to receive and store therein the derived first and second digital phase shift control values output by the sinusoidal computation component.

12. The radio frequency transmitter of claim 11, wherein the phase shifter controller further comprises a phase modifier arranged to receive the first and second phase values $\theta_1$, $\theta_2$, and derive the dynamic phase values $\theta_{1\_k}$, $\theta_{2\_k}$ from the first and second phase values $\theta_1$, $\theta_2$.

13. The radio frequency transmitter of claim 9, wherein the phase shifter controller further comprises sigma delta modulators arranged to convert high resolution digital phase shift control values derived by the digital synthesizer into modulated lower resolution digital phase shift control values output to the digital to analogue converters.

14. A method of generating phase shift control signals for a phase shifter, the method comprising:
receiving a first phase value θ1;
computing a first digital phase shift control value based on the received first phase value θ1;
receiving a second phase value θ2;
computing a second digital phase shift control value based on the received second phase value θ2; and
generate digital phase shift control signals based on the derived first and second digital phase shift control values;
outputting phase shift control signals;
receiving a phase value;
computing a digital phase shift control value based on the received phase value;
outputting the derived digital phase shift control value;
storing the derived first digital phase shift control value output;
storing the derived second digital phase shift control value output;
deriving a first dynamic phase value θ1 k from the first phase value θ1;
deriving a second dynamic phase value θ2 k from the second phase value θ2;
computing and outputting first and second digital phase shift control values based on the dynamic phase values θ1 k, θ2 k; and
receiving and storing the derived first and second digital phase shift control values for the phase shifter to generate an output signal.

15. The method of claim 14 further comprising:
receiving a first amplitude value $A_1$ and a second amplitude value $A_2$;
computing the first digital phase shift control value further based on the received first amplitude value $A_1$; and
computing the second digital phase shift control value further based on the received second amplitude value $A_2$.

16. The method of claim 14 further comprising performing sigma delta modulation to convert high resolution digital phase shift control values into modulated lower resolution digital phase shift control values to be output to digital to analogue converters.

* * * * *